United States Patent Office 3,252,995
Patented May 24, 1966

3,252,995
ETHYLIDENE-BIS-3-(2-PYRROLIDONE)
Frederick Grosser, Midland Park, and Eugene V. Hort, Edison, N.J., assignors to General Aniline & Film Corporation, New York, N.Y., a corporation of Delaware
No Drawing. Filed Oct. 2, 1963, Ser. No. 313,161
1 Claim. (Cl. 260—326.5)

This invention relates to ethylidene-bis-3-(2-pyrrolidone), a new compound, having many new and useful applications in the chemical industry and to the process of preparing the same.

We have found that ethylidene-bis-3-(2-pyrrolidone) can be readily prepared by first dissolving sodium in N-vinyl-2-pyrrolidone at a temperature of from 120° to 130° with no evolution of hydrogen. The resulting solution, after cooling to room temperature, solidifies to a waxy material. The latter, when hydrolyzed with water yields a white slurry, which after filtering, washing with water and drying yields crude ethylidene-bis-3-(N-vinyl-2-pyrrolidone), hereinafter referred to for simplicity as EBVP having a melting point of 117° C. During hydrolysis, little exotherm takes place with no evolution of hydrogen. By recrystallization from ethanol pure EBVP (crystalline solid) having a melting point of 121° C. is obtained. Upon hydrolysis of the pure EBVP with dilute acid such as 8–15% aqueous hydrochloric, sulfuric, trichloroacetic, phosphoric, etc., under nitrogen at a temperature of 90°–100° C., ethylidene-bis-3-(2-pyrrolidone) is obtained.

Since we have not established the reaction mechanism, or identified the by-products, we do not know the stoichiometry of the reaction of sodium with N-vinyl-2-pyrrolidone. The preferred range of sodium seems to encompass from 3 to 6% by weight of N-vinyl-2-pyrrolidone, corresponding to 0.15–0.30 atoms of sodium per molecule of N-vinyl-2-pyrrolidone. The yield of EBVP in this range is about 30% effective, based on the weight of N-vinyl-2-pyrrolidone. Amounts of sodium higher than 6% are very difficult to dissolve, even over a long period, and the final product may be a gummy oil rather than a crystalline solid. Amounts of sodium lower than 3% give little or no product, but a solution which upon standing develops an insoluble "popcorn" polymer.

As an alternative to the foregoing procedure, the sodium can be dissolved by refluxing a solution of N-vinyl-2-pyrrolidone in an inert-solvent diluent such as toluene, heptane, etc. The amount of inert-solvent diluent employed is immaterial so long as there is sufficient N-vinyl-2-pyrrolidone to satisfy the foregoing stoichiometric requirement. We prefer, however, a solution of equal parts by weight. When the sodium is completely dissolved, the solution is cooled to room temperature and the inert-solvent diluent decanted from the waxy material. The waxy material is heated with the same weight of inert-solvent diluent until sufficiently fluid to agitate, which after cooling to room temperature is again decanted. The combined liquid extracts are then evaporated to dryness and the residue hydrolyzed with a five-fold weight of water. After washing and drying the hydrolyzed residue, there is obtained EBVP in the same yield as before, but in slightly improved purity, i.e., melting at 119.4° C.

Instead of toluene or heptane as an inert-solvent diluent for the N-vinyl-2-pyrrolidone there may be used other inert-solvent diluents such as, for example, xylene, cumene, kerosene, naphtha, octane, etc.

The following examples will serve to further illustrate our invention:

*Example I*

A total of 25 grams of sodium metal was added over a half hour period to 475 grams of N-vinyl-2-pyrrolidone and stirred at 120–130° C. After about one more hour, the sodium had completely dissolved. The solution was allowed to cool and slowly solidified to a waxy material. This was agitated with 5 volumes of water, partly dissolving and leaving a white slurry. After filtering, washing with water and drying in a vacuum oven, there was obtained 140 grams of crude EBVP, M.P. 117° C. By recrystallization from ethanol, pure EBVP, M.P. 121° C., was obtained.

Percent calculated for $C_{14}H_{20}N_2O_2$: C, 67.71; H, 8.12; N, 11.31. Percent found: C, 67.93; H, 8.02; N, 11.61.

The pure product has the following structure:

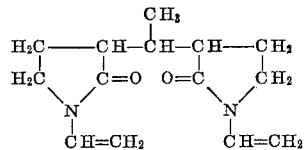

The foregoing structure was established not only from the elementary analyses, which agree very closely with the postulated empirical formula, $C_{14}H_{20}N_2O_2$, but also by means of nuclear magnetic resonance which shows that the two-carbon moiety is an ethylidene group linking two N-vinyl-2-pyrrolidone units in their 3-positions. The unsaturation of the two vinyl groups was determined by iodination. The value of 87.7% vinyl pyrrolidone corresponds to a molecular weight of 253 for a compound containing two vinyls. Since infra-red and ultra-violet spectra were very similar to those of N-vinyl-2-pyrrolidone, it was concluded that EBVP contained two N-vinyl-2-pyrrolidone units bound together with a two-carbon moiety, i.e. an ethylidene linkage.

Twenty grams of EBVP were dissolved in 200 ml. of 10% sulfuric acid and heated under nitrogen on a steam bath at 95–96° C. for one hour. The solution was cooled, agitated with 30 grams of powdered calcium carbonate and filtered, washing well with water. The combined filtrate and washings were evaporated to dryness under reduced pressure. Fifteen grams (95% yield) of crude ethylidene-bis-3-(2-pyrrolidone) were obtained melting at 242–246° C. On recrystallization from methanol this gave 14.5 grams (92% yield, overall) of pure white crystalline ethylidene-bis-3-(2-pyrrolidone), melting at 252° C., and having the following structure:

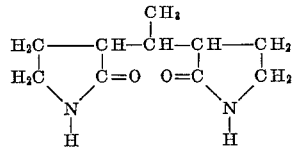

Elementary analyses of the new compound agree very closely with the postulated empirical formula,

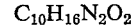

$C_{10}H_{16}N_2O_2$

The infra-red spectrum is very similar to that of 2-pyrrolidone, differing from it only in the same bands in which EBVP differs from N-vinyl-2-pyrrolidone.

*Example II*

Twelve grams of sodium were dissolved in a refluxing solution of 300 grams of vinyl pyrrolidone and 300 grams of toluene. When the sodium had completely dissolved, the solution was cooled and the toluene decanted from the waxy precipitate. The precipitate was heated with 300 grams more of toluene, until it became fluid, which after cooling was again decanted.

The combined toluene extracts were evaporated to dryness and the residue agitated with a five-fold weight of water. After washing and drying, 75 grams of EBVP, melting at 119.4°, was obtained. By recrystallization from ethanol pure EBVP, M.P. 121° C., was obtained.

Upon hydrolysis of the pure EBVP as in Example I, the ethylidene-bis-3-(2-pyrrolidone) obtained was in a substantially quantititative yield conforming to the elementary analyses, infra-red spectrum and structure given above.

The ethylidene-bis-3-(2-pyrrolidone) is soluble in water, lower aliphatic alcohols and chloroform, but insoluble in non-polar organic solvents. It melts without polymerization at 250° C. It reacts with concentrated sodium hydroxide solution in acetone to give N,N-disodium derivatives which react with chloride derivatives of aliphatic alcohols and phenols of the type disclosed in U.S. Patents 2,249,111; 2,098,203; 2,097,441; 2,097,411 and 2,209,911, to yield a new series of surface active agents.

One mole of the ethylidene-bis-3-(2-pyrrolidone) hydrolyzes with two moles of aqueous calcium hydroxide at 120° C. to yield a calcium salt of a diamino dicarboxylic acid which after neutralization with sulfuric acid yields the free acid of the following structure:

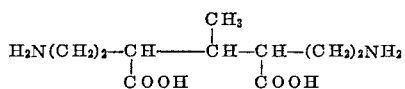

The ethylidene-bis-3-(2-pyrrolidone) and the foregoing diaminodiacid are useful crosslinking agents for polyamides.

We claim:

Ethylidene-bis-3-(2-pyrrolidone) having the following formula:

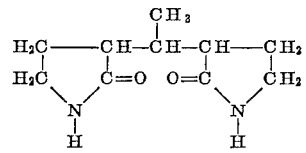

References Cited by the Examiner

Shostakovskii et al., "Chemical Abstracts," vol. 49, col. 10853d, 1955.

NICHOLAS S. RIZZO, *Primary Examiner.*

HENRY R. JILES, J. A. NARCAVAGE,
*Assistant Examiners.*